Nov. 13, 1928.
W. A. KIRK
SASH FASTENER
Filed Aug. 4, 1927
1,691,485
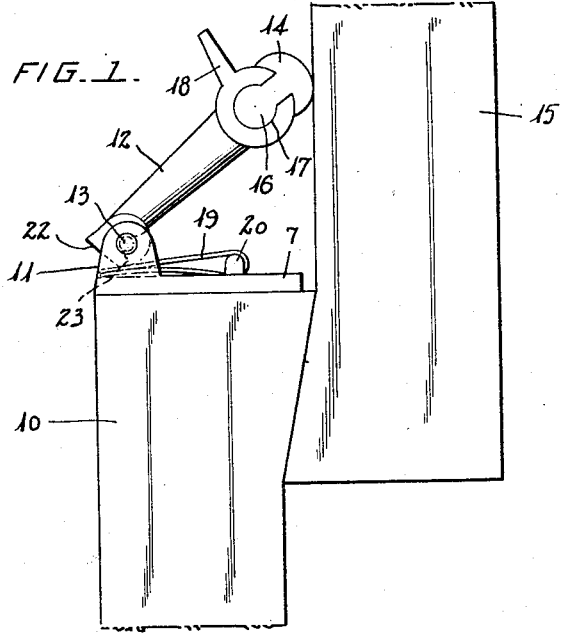
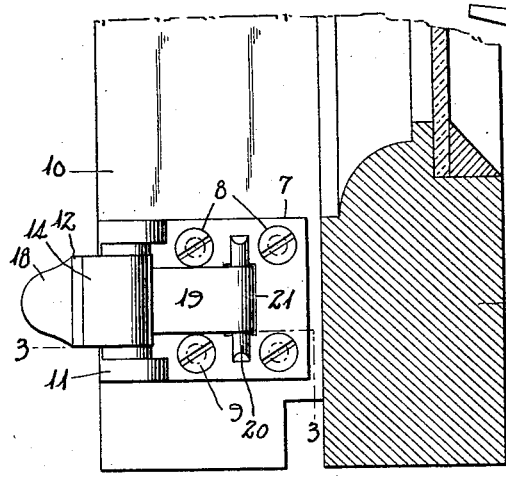
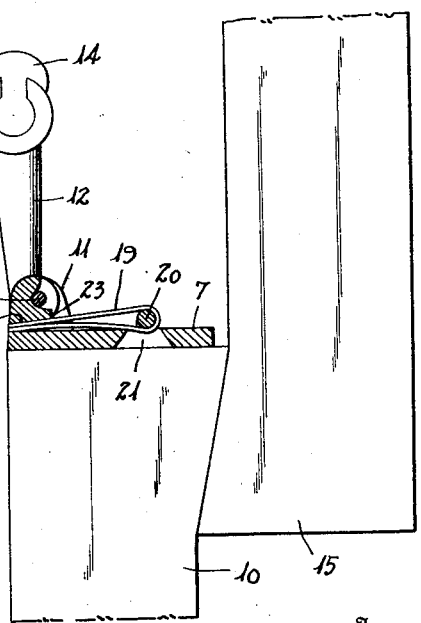
Inventor:
W. A. Kirk
By Monroe E. Miller
Attorney.

Patented Nov. 13, 1928.

1,691,485

UNITED STATES PATENT OFFICE.

WILLIAM A. KIRK, OF HOT SPRINGS NATIONAL PARK, ARKANSAS.

SASH FASTENER.

Application filed August 4, 1927. Serial No. 210,625.

The present invention relates to sash fasteners and aims to provide a novel and improved device of that kind.

It is another object of the invention to provide a simple and effective sash fastener which may be secured on lower sashes of different thicknesses and which has novel means for maintaining the dog in either fastening or released position.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a side elevation of the improved sash fastener, with the dog in fastening position.

Fig. 2 is a plan view of the device with the dog in released position.

Fig. 3 is a section of the device on the line 3—3 of Fig. 2.

The sash fastener comprises a base 7 of suitable metal and size, which has apertures 8 to receive screws 9 or other securing elements to fasten the base on the lower sash 10 of a window, and the base 7 may be readily positioned with respect to the upper sash when using the device on lower sashes of different thicknesses.

The base 7 is provided adjacent to its outer end with a pair of upstanding ears 11 between which a dog 12 is mounted for swinging movement on a pivot pin or rivet 13 engaging through said ears 11 and dog, thereby mounting the dog for swinging movement toward and away from the upper sash 15. The dog 12 has a tip 14 of rubber or other frictional material, which may be secured on the end of the dog in any suitable manner. As shown, the tip 14 has a stem 16 fitted within a slot or recess 17 in the dog, although other means of attachment may be used. The tip or friction member 14 contacting with the upper sash 15 will prevent the dog and upper sash from slipping relatively to one another by the upward movement of the lower sash or the downward movement of the upper sash, so that when the dog 12 is in the position shown in Fig. 2, leaning against the upper sash, the sashes cannot be moved relatively to one another to raise the lower sash or lower the upper sash.

The dog 12 has a finger piece 18 projecting therefrom for conveniently swinging the dog by hand.

A spring 19 is provided for holding the dog in either fastening or released position. Said spring is a doubled leaf spring, the loop of which embraces a cross member 20 of the base 7 which bridges an opening 21 in the base, and the lower portion of the spring bears on the base 7 along the corresponding edge of the opening 21, as seen in Fig. 3. The spring 12 may be readily moved upwardly through the opening 21 to engage the member or portion 20, before the base is secured on the sash, and the terminals of the spring project between the ears 11 below the lower end of the dog. The lower end of 22 of the dog forms an abutment to seat on the spring 19 when the dog is moved to released position, thereby supporting the dog in upstanding position, as seen in Fig. 3, and the dog has the corner or cam 23 that moves on the spring 19, under the pivot axis of the dog, so that when the dog is swung to fastening position, as seen in Fig. 1, the upward pressure on the corner or cam 23 by the spring 19 will hold the dog against the sash 15, thereby preventing the dog from being accidentally released, and also preventing the dog from being disengaged from fastening relation with the upper sash by a knife blade inserted upwardly between the sashes.

Having thus described the invention, what is claimed as new is:—

1. A sash fastener comprising a base having an opening and a portion bridging said opening, a dog pivotally mounted on said base, and a doubled leaf spring having its loop embracing said portion and having its terminals projecting below said dog, the dog having an abutment to bear on the spring for holding the dog in released position and said dog having a cam to move on the spring for holding the dog in fastening position.

2. A sash fastener comprising a base having a pair of upstanding ears, a pivot extending through said ears, a dog mounted on said pivot between the ears, the base having a bridging portion thereon spaced from said pivot, and a doubled leaf spring having its loop embracing said portion and having its terminals extending between said ears below said pivot, the dog having portions to bear on the spring for holding the dog in released position and moving the dog to fastening position when the dog is moved in opposite directions.

In testimony whereof I hereunto affix my signature.

WILLIAM A. KIRK.